US010503391B2

(12) United States Patent
Lim et al.

(10) Patent No.: US 10,503,391 B2
(45) Date of Patent: Dec. 10, 2019

(54) DEVICE, SYSTEM AND METHOD FOR CORRECTING OPERATIONAL DEVICE ERRORS

(71) Applicant: MOTOROLA SOLUTIONS, INC., Chicago, IL (US)

(72) Inventors: Bing Qin Lim, Jelutong (MY); Guo Dong Gan, Kuala Lumpur (MY); Chew Yee Kee, Alor Setar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 200 days.

(21) Appl. No.: 15/816,241

(22) Filed: Nov. 17, 2017

(65) Prior Publication Data
US 2019/0155478 A1 May 23, 2019

(51) Int. Cl.
G09B 19/00 (2006.01)
G09B 3/00 (2006.01)
G06F 15/16 (2006.01)
G06F 15/173 (2006.01)
G06F 3/0488 (2013.01)
G06F 3/01 (2006.01)
G06F 11/34 (2006.01)
(Continued)

(52) U.S. Cl.
CPC ............ G06F 3/0488 (2013.01); G06F 3/011 (2013.01); G06F 9/453 (2018.02); G06F 11/3438 (2013.01); G06F 3/0362 (2013.01); G06F 3/165 (2013.01)

(58) Field of Classification Search
CPC ........ G09B 19/0053; G09B 7/00; G09B 5/00; G06F 9/453; G06Q 10/10
See application file for complete search history.

(56) References Cited

U.S. PATENT DOCUMENTS 7,433,710 B2  10/2008 Bodnar et al.
7,668,990 B2   2/2010 Krzyzanowski et al.
(Continued)

FOREIGN PATENT DOCUMENTS

WO    WO-2011150330 A2    12/2011

OTHER PUBLICATIONS http://www.trustedreviews.com/news/apple-s-new-switch-from-android-site-says-life-is-easier-on-iphone—Retrieved on Nov. 16, 2017.
(Continued)

Primary Examiner — Jordany Nunez
(74) Attorney, Agent, or Firm — Perry + Currier, Inc.

(57) ABSTRACT

A device, system and method for correcting operational device errors is provided. A memory stores first operational data associated with first context data and a first device, the first operational data indicative of how a given user action is performed at the first device to implement a given function defined by the first context data. A controller receives data indicative of a user action at a second device; when the data does not correspond to a respective function at the second device, and when current context data of the second device corresponds to the first context data of the first device, an intended function for the user action is identified by comparing the data with the first operational data. When a correspondence occurs, operational information indicative of how to implement the given function at the second device is retrieved and provided at one or more notification devices.

20 Claims, 11 Drawing Sheets

(51) Int. Cl.
  *G06F 9/451* (2018.01)
  *G06F 3/0362* (2013.01)
  *G06F 3/16* (2006.01)

(56) References Cited

U.S. PATENT DOCUMENTS

| | | | |
|---|---|---|---|
| 7,738,860 B2 | 6/2010 | Attride et al. | |
| 7,912,993 B2 | 3/2011 | Ziegler | |
| 8,239,047 B1* | 8/2012 | Bergeron | G09B 9/02 |
| | | | 463/47 |
| 8,855,617 B2 | 10/2014 | Gautier et al. | |
| 9,092,407 B2* | 7/2015 | Carney | G06F 17/24 |
| 9,288,660 B2 | 3/2016 | Puusaari et al. | |
| 9,814,835 B2* | 11/2017 | Kruse | A61M 5/1413 |
| 10,136,295 B1 | 11/2018 | Chee et al. | |
| 2002/0083179 A1* | 6/2002 | Shaw | G06F 16/9574 |
| | | | 709/227 |
| 2002/0133493 A1* | 9/2002 | Mascarenhas | G06Q 30/02 |
| 2003/0051077 A1* | 3/2003 | Fengler | G06Q 10/10 |
| | | | 710/8 |
| 2003/0115091 A1* | 6/2003 | Sawyer | G06F 8/61 |
| | | | 709/219 |
| 2003/0235810 A1* | 12/2003 | Ide | G09B 7/00 |
| | | | 434/350 |
| 2004/0140987 A1* | 7/2004 | Howell, Jr. | G06Q 10/087 |
| | | | 715/700 |
| 2004/0215788 A1 | 10/2004 | Morris | |
| 2004/0259068 A1* | 12/2004 | Philipp | G06Q 10/10 |
| | | | 434/350 |
| 2005/0042593 A1* | 2/2005 | Hopkins | G09B 5/00 |
| | | | 434/350 |
| 2005/0282126 A1 | 12/2005 | Pesso | |
| 2006/0015478 A1 | 1/2006 | Beringer et al. | |
| 2006/0028429 A1* | 2/2006 | Kanevsky | G06F 3/011 |
| | | | 345/156 |
| 2006/0165464 A1* | 7/2006 | Chang | G09B 13/04 |
| | | | 400/472 |
| 2006/0294350 A1 | 12/2006 | Yang et al. | |
| 2007/0166672 A1* | 7/2007 | Morita | G06Q 10/10 |
| | | | 434/118 |
| 2008/0059882 A1* | 3/2008 | McKirchy | G09B 7/02 |
| | | | 715/705 |
| 2008/0174547 A1* | 7/2008 | Kanevsky | G06F 3/011 |
| | | | 345/156 |
| 2009/0298020 A1* | 12/2009 | Corcoran | G09B 19/0053 |
| | | | 434/118 |
| 2010/0192063 A1* | 7/2010 | Saoumi | G06F 9/453 |
| | | | 715/707 |
| 2011/0119479 A1* | 5/2011 | Cowie | G06Q 10/06 |
| | | | 713/100 |
| 2012/0133484 A1* | 5/2012 | Griffin | G06F 21/51 |
| | | | 340/5.54 |
| 2013/0120279 A1* | 5/2013 | Plichta | G06F 3/04883 |
| | | | 345/173 |
| 2013/0227225 A1 | 8/2013 | Oliver et al. | |
| 2013/0268879 A1 | 10/2013 | Zhang et al. | |
| 2013/0325758 A1* | 12/2013 | Alphin, III | G09B 19/0053 |
| | | | 706/12 |
| 2014/0368436 A1* | 12/2014 | Abzarian | G06F 3/0488 |
| | | | 345/168 |
| 2014/0370476 A1* | 12/2014 | Nageshwar | G09B 7/00 |
| | | | 434/270 |
| 2015/0044653 A1* | 2/2015 | Levine | G09B 7/08 |
| | | | 434/262 |
| 2016/0287142 A1* | 10/2016 | Han | A61B 5/7405 |
| 2017/0156674 A1* | 6/2017 | Hochman | A61B 5/04001 |
| 2017/0318213 A1* | 11/2017 | Oshima | H04B 10/116 |
| 2018/0157880 A1 | 6/2018 | Nair et al. | |
| 2018/0232829 A1* | 8/2018 | Dorenkamp | G06Q 50/205 |

OTHER PUBLICATIONS https://support.apple.com/en-us/HT204216—Retrieved on Nov. 16, 2017.

https://www.microsoft.com/surface/en-us/support/getting-started/switch-from-mac-to-microsoft-surface?ranMID=24542&ranEAID=TnL5HPStwNw&ranSiteID=TnL5HPStwNw-X_BAk3aNn0Nee4PvVYawvg&tduid=(5ccba07e73f3e254e8413a63d8c06fc3)(256380)(2459594)(TnL5HPStwNw-X_BAk3aNn0Nee4PvVYawvg)()—Retrieved on Nov. 16, 2017.

ISA/EP, International Search Report and Written Opinion, dated Feb. 27, 2019, re PCT International Patent Application No. PCT/US2018/059436.

\* cited by examiner

DEVICE, SYSTEM AND METHOD FOR CORRECTING OPERATIONAL DEVICE ERRORS

BACKGROUND OF THE INVENTION

Different devices that have similar functionality may be operated according to different user actions for implementing a same given function. When a second device replaces a first device, there may be confusion in how to operate the second device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
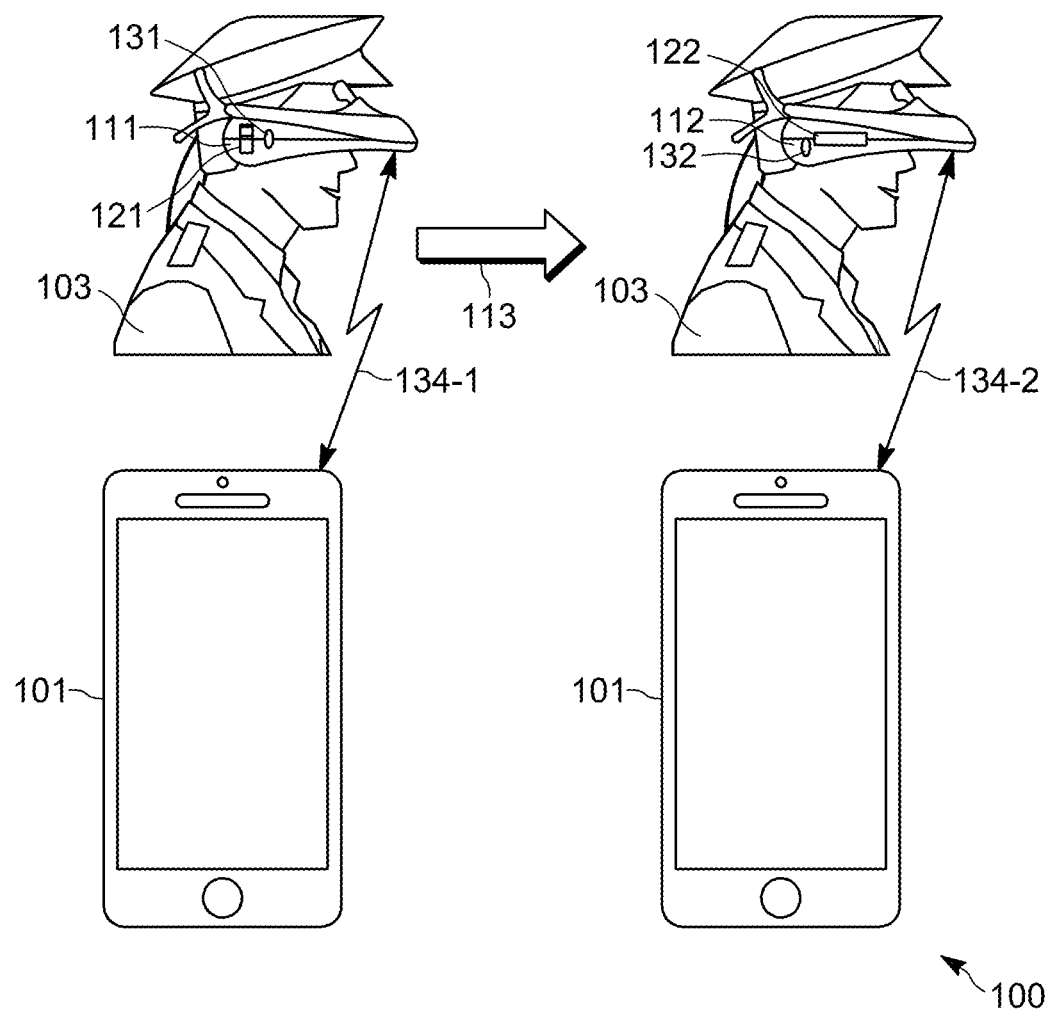
FIG. 1 depicts a system for correcting operational device errors in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Different devices that have similar functionality may be operated according to different user actions for implementing a same given function. For example, a first device may have a mechanical slider at a given location, and/or orientation, for implementing a function (e.g. increasing or decreasing audio), while a second device may have a touch slider at a different location, and/or different orientation, for implementing the same function. Similarly, a similar function at two different devices may be implemented according to a different force being applied to a respective mechanical device. Similarly, a function of an application may be implemented at a first device using a double tap at a given location, while a similar function of a similar application may be implemented at a second device using a long tap at a different (or same) given location. When a user switches from using a first device to a second device, they generally attempt to operate the second device according to how the first device was used. For example, they may attempt to touch the second device at the position of the mechanical slider of the first device to change volume; and/or they may attempt to apply a large given force to a mechanical device, to implement a function, that may damage the mechanical device; and/or they may attempt to implement a function of an application using a double tap rather than a long press. Such operational device errors may lead to a waste of processing resources at the second device, as the second device attempts to process input that has no associated function; such operational device errors may also lead to mechanical damage at the second device, for example due to an applied pressure being too high. Furthermore, such operational device errors may lead to frustration on the part of the user, which may lead to the user returning and/or exchanging and/or throwing away the second device, which may lead to waste.

An aspect of the specification provides a device comprising: a memory storing first operational data associated with first context data and a first device, the first operational data indicative of how a given user action is performed at the first device to implement a given function in a given context defined by the first context data; and a controller configured to: receive data indicative of a user action at a second device; when the data indicative of the user action at the second device does not correspond to a respective function at the second device, and when current context data of the second device corresponds to the first context data of the first device, identify an intended function for the user action by comparing the data indicative of the user action at the second device with the first operational data associated with the first context data; when the data indicative of the user action at the second device corresponds to the given function associated with the first operational data of the first device, retrieve operational information indicative of how to implement the given function at the second device; and control one or more notification devices to provide the operational information of how to implement the given function at the second device.

Another aspect of the specification provides a method comprising: receiving, at a controller, data indicative of a user action at a second device, the controller in communication with a memory storing first operational data associated with first context data and a first device, the first operational data indicative of how a given user action is performed at the first device to implement a given function in a given context defined by the first context data; when the data indicative of the user action at the second device does not correspond to a respective function at the second device, and when current context data of the second device corresponds to the first context data of the first device, identifying, at the controller, an intended function for the user action by comparing the data indicative of the user action at the second device with the first operational data associated with the first context data; when the data indicative of the user action at the second device corresponds to the given function associated with the first operational data of the first device, retrieving, at the controller, from the memory, operational information indicative of how to implement the given function at the second device; and controlling, using the controller, one or more notification devices to provide the operational information of how to implement the given function at the second device.

FIG. 1 is a block diagram of an example system 100 comprising a communication device 101 being operated by a user 103. The user 103 is initially using a first device 111 in communication with the communication device 101 (interchangeably referred to hereafter as the device 101). As depicted, the first device 111 comprises an augmented reality device and/or a heads-up display device, however the first device 111 may comprise any device that can be operated at least partially via the communication device 101. As depicted in FIG. 1, the user 103 replaces the first device 111 with a second device 112, for example as represented by the arrow 113. The second device 112 may be similar to the first device 111 and hence, in the depicted example, the second device 112 also comprises an augmented reality display device and/or a heads-up display device. For example, the second device 112 may be a newer and/or different version (e.g. model) of the first device 111.

As depicted, the first device 111 includes a mechanical slider 121 in a vertical position (e.g. when the first device 111 is being worn by the user 103) for adjusting, for example, a volume of the first device 111, and the second device 112 includes a touch slider in a horizontal position (e.g. when the second device 112 is being worn by the user 103). Furthermore, the touch slider 122 is in a more forward position on the second device 112 as compared to the mechanical slider 121 on the first device 111. Hence, when the user 103 is using the first device 111, the user 103 becomes trained to adjust the volume of the first device 111 by placing his hand and/or finger towards the back of the first device 111 and moving his hand and/or finger up and down. When the user 103 switches to using the second device 112, the initial inclination of the user 103 to adjust the volume of the second device 112 will be to again place his hand and/or finger towards the back of the second device 112 (e.g. at a location corresponding to the position of the mechanical slider on the first device 111) and move his hand and/or finger up and down. Such an operation to adjust the volume of the second device 112 is incorrect and the user 103 may waste time checking a user manual of the second device 112 to determine how to adjust volume. As depicted, the user 103 is a police officer and/or a first responder and hence such checking of the user manual may waste valuable time in an emergency situation.

While the depicted example is described with respect to volume controls, the user 103 may attempt to operate other corresponding input devices at each of the devices 111, 112 that are differently located and/or differently oriented and/or differently operated to implement a similar function, including, but not limited to buttons, touch pads, touch screens, switches, and the like. Such other corresponding input devices may include controls for adjusting a focus of camera of each of the devices 111, 112, operating an emergency call function, operating a telephone function, etc. Indeed, any corresponding input devices at each of the devices 111, 112 for implementing functionality of the devices 111, 112 is within the scope of present embodiments.

In the depicted example, the first device 111 comprises one or more sensors 131 configured to sense a user action at the first device 111 including, but not limited to, detecting a position of the hand and/or finger of the user 103 as the user 103 is operating the mechanical slider 121, and/or any other input device of the first device 111. Similarly, the second device 112 comprises one or more sensors 132 configured sense a user action at the second device 112 including, but not limited to, detecting a position of the hand and/or finger of the user 103 as the user 103 is attempting to operate the touch slider 122, and/or any other input device of the second device 112. As will be described in more detail below, the one or more sensors 132 of the second device 112 may be used to assist in correcting operational device errors in the PAN formed by the communication device 101 and the second device 112.

As depicted, the communication device 101 is in communication with the first device 111 via a communication link 134-1, and a personal area network (PAN) may be formed between the first device 111 and the communication device 101. When the user 103 switches from the first device 111 to the second device 112, the communication device 101 is in communication with the second device 112 via a communication link 134-2, and a personal area network (PAN) may be formed between the second device 112 and the communication device 101. The communication links 134-1, 134-1 are interchangeably referred to hereafter as, collectively, the links 134 and, generically, as a link 134.

While the devices 111, 112 are depicted as augmented reality glasses being worn by the user 103, each of the devices 111, 112 may generally comprise a mobile device which includes, but is not limited to, any suitable combination of radio devices, peripheral devices, headphones, radio-speaker-microphones, electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments, for example any peripheral device that may form a PAN with the communication device 101. Furthermore, the devices 111, 112 may be incorporated into vehicles, and the like (for example emergency service vehicles), as a windshield heads-up display device and the like.

Similarly, while the communication device 101 is depicted as a mobile communication device, the communication device may generally comprise any type of device that may communicate with the devices 111, 112 including, but not limited to, any suitable combination of radio devices, electronic devices, communication devices, computing devices, portable electronic devices, mobile computing devices, portable computing devices, tablet computing devices, telephones, PDAs (personal digital assistants), cellphones, smartphones, e-readers, mobile camera devices and the like. However, other suitable devices are within the scope of present embodiments, for example any communication device that may form a PAN with the devices 111, 112. Furthermore, the communication device 101 may be incorporated into vehicles, and the like (for example emergency service vehicles), as a radio, an emergency radio, a vehicle smart control system, and the like.

In some embodiments, the device 101 is specifically adapted for emergency service radio functionality, and the like, used by emergency responders and/or emergency responders, including, but not limited to, police service responders, fire service responders, emergency medical service responders, and the like. In some of these embodiments, the device 101 further includes other types of hardware for emergency service radio functionality, including, but not limited to, push-to-talk ("PTT") functionality. Indeed, the device 101 may be configured to wirelessly communicate over communication channels which may include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

However, each of the device 101 and/or the devices 111, 112 may be further adapted for use as a consumer device and/or business device, and the like, and/or may include additional or alternative components related to, for example, telephony, messaging, entertainment, and/or any other components that may be used with computing devices and/or communication devices.

Figure 2:
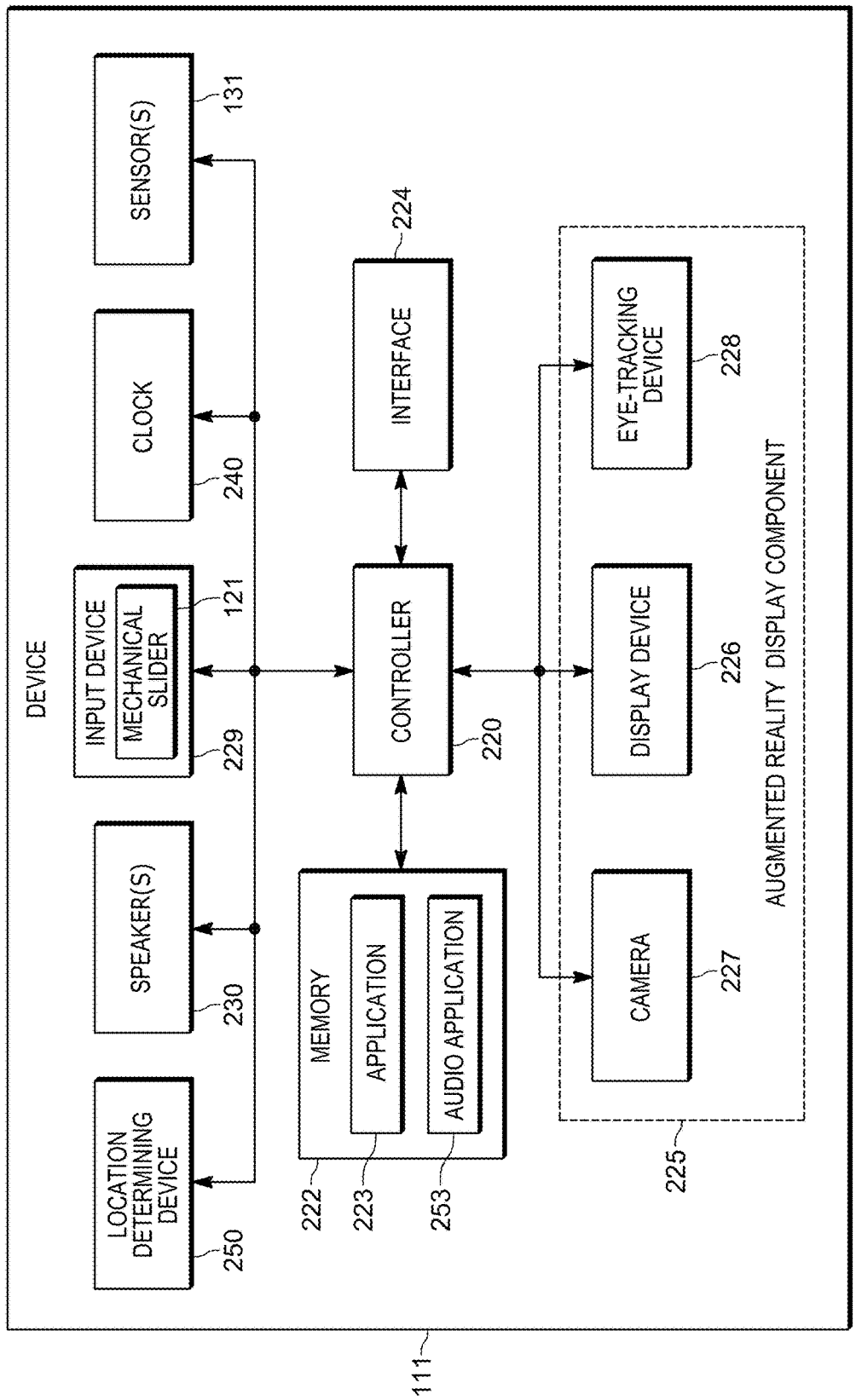
FIG. 2 depicts a block diagram of a first device that is being replaced by a second device in the system of FIG. 1, in accordance with some embodiments.

Attention is next directed to FIG. 2, which depicts a block diagram of the example first device 111, the first device 111 comprising: the one or more sensors 131; a controller 220; a memory 222 storing an application 223; a communication interface 224 (interchangeably referred to as the interface 224); an augmented reality component 225 (including a camera 227, a display device 226, a camera 227 and an optional eye-tracking device 228; at least one input device 229); at least one input device 229, including the mechanical slider 121; one or more speakers 230; an optional clock 240; and an optional location determining device 250.

The controller 220 is generally in communication with other components of the first device 111. The controller 220 includes one or more logic circuits, one or more processors, one or more microprocessors, one or more ASIC (application-specific integrated circuits) and one or more FPGA (field-programmable gate arrays). In some embodiments, the controller 220 and/or the first device 111 is not a generic controller and/or a generic device, but a device specifically configured to implement operational device error correction assistance functionality. For example, in some embodiments, the first device 111 and/or the controller 220 specifically comprises a computer executable engine configured to implement specific functionality for operational device error correction assistance.

The memory 222 is a machine readable medium that stores machine readable instructions to implement one or more programs or applications. Example machine readable media include a non-volatile storage unit (e.g. Erasable Electronic Programmable Read Only Memory ("EE-PROM"), Flash Memory) and/or a volatile storage unit (e.g. random access memory ("RAM")). Programming instructions (e.g., machine readable instructions) that implement the functional teachings of the first device 111 as described herein are maintained, persistently, at the memory 222 and used by the controller 220 which makes appropriate utilization of volatile storage during the execution of such programming instructions.

In particular, the memory 222 of FIG. 2 stores instructions corresponding to the application 223 that, when executed by the controller 220, enables the controller 220 to implement the operational device error correction assistance functionality associated with the application 223. Furthermore, as depicted, the memory 222 further stores an audio application 253 that, when executed by the controller 220, enables the controller 220 to control the one or more speakers 230 when input is received at the mechanical slider 121, for example to adjust a volume of the one or more speakers 230. The audio application 253 may be component of an augmented reality application which, when executed by the controller 220, enables the controller 220 to implement augmented reality functionality of the first device 111.

In the illustrated example, when the controller 220 executes the application 223, the controller 220 is enabled to: determine that a function is being implemented; determine context data of the first device 111 when the function is implemented; receive, from the one or more sensors 131 and/or the mechanical slider 121, data indicative of a user action for implementing the function; and transmit, to the communication device 101, using the communication interface 224, operational data, that includes the data indicative of the user action for implementing the function, and the context data associated with the operational data. The operational data and the context data can be transmitted with an identifier of the first device 111 as well as an indication of the function implemented.

For example, the controller 220 may be configured to determine when a function is implemented at the first device 111, such as adjusting the volume of the one or more speakers 230 and/or any function controlled by operation of any other input device 229.

Indeed, a determination of a function may occur anytime a change associated with an operation of an input device 229 occurs. Alternatively, the controller 220 may be configured (e.g. when executing the application 223) to determine when specific given functions are being implemented, such as adjusting volume of the one or more speakers 230.

The controller 220 may further determine context data of the first device 111 when the function is implemented; such context data can include, but is not limited to: an application being executed at the controller 220, such as the audio application 253, when the function is implemented; a time that the function is implemented, as determined using the clock 240 including, but not limited to, a given time period after the first device 111 is turned on and/or establishes a PAN with the device 101; and a location of the first device 111 when the function is implemented, as determined using the location determining device 250.

The controller 220 may further receive the data indicative of a user action for implementing the function from the mechanical slider 121, for example sensor data from the one or more sensors 131 when the function is implemented, which may be received at the controller 220 upon request from the one or more sensors 131; alternatively, the controller 220 may be receiving the sensor data from the one or more sensors 131 on an on-going basis (e.g. periodically), but may discard and/or ignore such sensor data until the controller 220 determines that the function has been implemented.

In some embodiments, the controller 220 may receive the data indicative of a user action for implementing the function from an input device. While the present example is directed to the mechanical slider, in other examples implementation of a function may occur via operation of a button and/or a touch screen in a given manner. For example, when a user action that implements a function includes operation of touch screen, data indicative of a user action for implementing a function may include data indicative of motion of a finger interacting with a touch screen (e.g. according to a given pattern, a given number of taps, a given sequence of menu selection, and the like). Similarly, when a user action that implements a function includes operation of a button, data indicative of a user action for implementing a function may include data indicative of an interaction of a finger operating the button (e.g. according to a given number of presses and/or taps, a length of a press, and the like).

Continuing with the example embodiment in the depicted example of FIG. 1 and FIG. 2, where data indicative of a user action for implementing the function comprises sensor data received from the one or more sensors 131, the one or more sensors 131 may comprise one or more of proximity sensors configured to sense a user action such as a position of a hand and/or a finger of the user 103 relative to at least the mechanical slider 121. For example, the one or more sensors 131 may sense the position of a hand and/or a finger of the user 103 relative to at least the mechanical slider 121, as well as up/down movement of the hand and/or the finger of the user 103 relative to at least the mechanical slider 121 (e.g. when the first device 111 is being worn by the user 103) when the hand and/or the finger of the user 103 is operating the mechanical slider 121.

However, the one or more sensors 131 may alternatively comprise an accelerometer, a magnetometer, and the like, and/or any other type of sensor and/or combination of sensors that can be used to sense a user action at the first device 111; for example, when the first device 111 includes a device which is to be worn in a particular orientation (e.g. relative to the user 103 for a function to be implemented, for example a remote-speaker-microphone, the one or more sensors 131 may comprise sensors which may sense an orientation of the first device 111 as positioned by the user 103.

The interface 224 is generally configured to wirelessly communicate with the communication device 101, and the link 134-1 may include, but is not limited to any suitable combination of wired and wireless communication links, and/or any suitable combination of wired networks and/or wireless networks.

In some embodiments, the interface 224 may be implemented by, for example, one or more radios and/or connectors and/or network adaptors, configured to communicate wirelessly, with network architecture that is used to implement the link 134-1 and/or communication channels over the link 134-1. The interface 224 may include, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 902.16 standard, and/or other similar type of wireless transceiver configurable to communicate via a wireless network for infrastructure communications.

In yet further embodiments, the interface 224 includes one or more local area network or personal area network transceivers operating in accordance with an IEEE 902.11 standard (e.g., 902.11a, 902.11b, 902.11g), and/or a Bluetooth™ transceiver which may be used to communicate with the communication device 101. In some embodiments, the interface 224 is further configured to communicate "radio-to-radio" on some communication channels (e.g. in embodiments where the interface 224 includes a radio), while other communication channels are configured to use wireless network infrastructure.

In the example embodiment, the first device 111 includes the augmented reality component 225 which generally comprises the display device 226, the camera 227 and, optionally, the eye-tracking device 228. With brief reference back to FIG. 1, the first device 111 is configured to be worn by a user, such as the user 103, and hence the first device 111 is generally configured as a wearable device. In these embodiments, the display device 226 comprises a heads-up display device and the like. As such, the first device 111 further comprises a housing which is wearable by the user 103, for example in a manner similar to glasses and the like, upon which the mechanical slider 121 and the one or more sensors 131 are located.

In particular, the camera 227 is mounted on the first device 111 in a forward-facing direction (e.g. away from the user 103) such that images acquired by the camera 227 generally correspond to a direction in which the user 103 is looking with their eyes, and the eye-tracking device 228 may track an eye-gaze direction of eyes of the user 103. Indeed, in some embodiments, data indicative of a user action for implementing a function may be received at the controller 220 from the eye-tracking device 228, when a function is being implemented at the first device 111, as determined by the controller 220 when executing the application 223.

Furthermore, it is understood that the display device 226 of the first device 111 is generally mounted such that the display device 226 is viewable by the user 103, and that images acquired by the camera 227, and/or augmented images, may be provided and/or rendered and/or displayed at the display device 226 such that the user 103 may view the environment in a forward-facing direction using the display device 226 in an augmented fashion.

The display device 226 comprises one or more display devices, for example, one display device for each eye of a user, or one display device viewable by both eyes of a user. Either way, the display device 226 comprises one or more of a cathode ray tube, a flat panel display, a liquid crystal display, an organic light emitting display, and the like.

The camera 227 generally comprises one or more camera devices and/or video devices configured to acquire electronic images, including, but not limited to, a charge-coupled device (CCD) camera, and the like. Indeed, in some embodiments, sensor data may be received at the controller 220 from the camera 227, when a function is being implemented at the first device 111, as determined by the controller 220 when executing the application 223. In other words, the camera 227 may be used to determine context data.

Similarly, the eye-tracking device 228 comprises one or more sensors configured to determine an eye-gaze direction including, but not limited to, one or more cameras arranged to acquire images of eyes of a user (e.g. the user 103) using the first device 111.

The input device 229 may comprises any combination of one or more input devices configured to receive input to control, for example, the display device 226, the interface 224, the one or more speakers 230 and the like. The input device 229 may include a touch panel, a pointing device, a virtual keyboard (e.g. provided at the display device), one or more buttons, one or more switches, and the like; in the depicted example embodiment, the input device 229 includes the mechanical slider 121.

The clock 240 may comprise any clock device that enables the controller 220 to determine a time that a function is implemented, which may include a date as well as a time. While the clock 240 is depicted as a separate component, the clock 240 may be incorporated with the controller 220, for example as a timing device of the controller 220. Alternatively, a clock may be accessible by the controller 220 via the interface 224, including, but not limited to, a clock located at a server with which the device 101 is in communication via the interface 224 and/or a clock at the device 101.

The location determining device 250 includes any device configured to determine a location of the first device 111, including, but not limited to, one or more of a GPS device, a GLONASS device, a Galileo device, a Beidou device, a triangulation device, and the like.

In yet the depicted example embodiments, the first device 111 is in communication (e.g. via the interface 224) with the communication device 101 forming a PAN. In these embodiments, the communication device 101 may be used to receive input which is conveyed to the first device 111; in other words, in some embodiments, a portion of the functionality of the first device 111 may be controlled using one or more input devices at the communication device 101, and the input device 229 may be optional. Indeed, in such embodiments, the communication device may assume other functions of the first device 111 as described including, but not limited to, time determination functionality, location determination functionality, function determination functionality (e.g. determining when a function is being implemented and/or inferring a function that is going to be implemented, for example as based on received input and/or sensor input), and the like.

Furthermore, while not depicted, it is assumed that first device 111 includes a power source, including, but not limited to, a battery, a power pack, and the like.

It should be understood that a wide variety of configurations for the first device 111 are within the scope of present embodiments.

Figure 3:
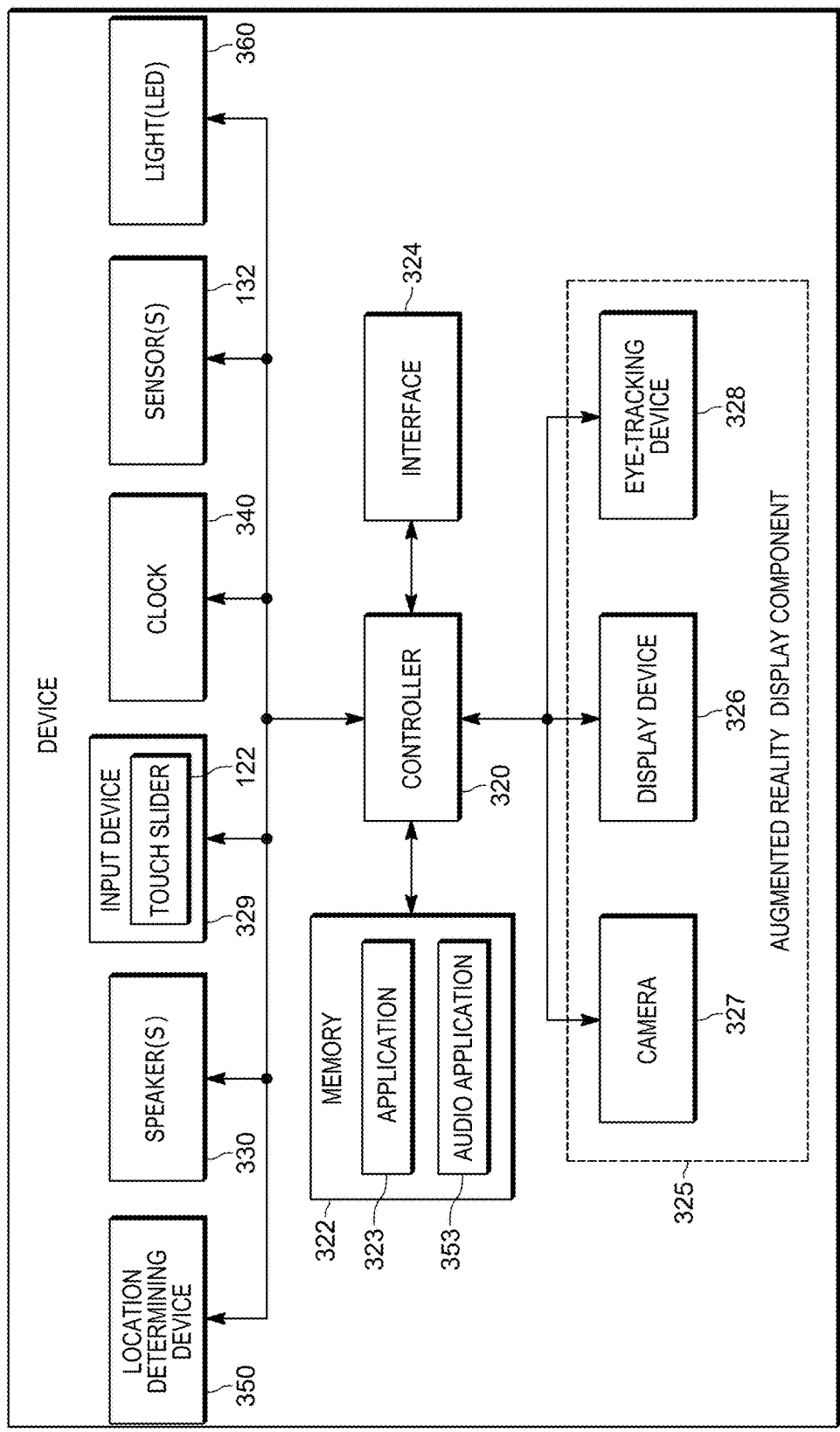
FIG. 3 depicts a block diagram of a second device that replacing a first device in the system of FIG. 1, in accordance with some embodiments.

Attention is next directed to FIG. 3, which depicts a block diagram of the example second device 112. The example second device 112 is substantially similar to the first device 111, with like components having like numbers, however in a "300" series rather than a "200" series, the second device 112 further including the touch slider 122 which replaces the mechanical slider 121, as well as the one or more sensors 132. Hence, the second device 112 comprises: the one or more sensors 132; a controller 320; a memory 322 storing an application 323; a communication interface 324 (interchangeably referred to as the interface 324); an augmented reality component 325 (including a camera 327, a display device 326, a camera 327 and an optional eye-tracking device 328; at least one input device 329); at least one input device 329, including the touch slider 122; one or more speakers 330; an optional clock 340; and an optional location determining device 350. As depicted, the memory 322 further stores an audio application 353.

The second device 112 is hence generally similar to the first device 111, except the volume of the one or more speakers 330 is adjusted using the touch slider 122 and the one or more sensors may sense the position of a hand and/or a finger of the user 103 relative to at least the touch slider 122, as well as side-to-side movement of the hand and/or the finger of the user 103 relative to at least the touch slider 122 (e.g. when the second device 112 is being worn by the user 103) when the hand and/or the finger of the user 103 is operating the touch slider 122.

In particular, the memory 322 of FIG. 3 stores instructions corresponding to the application 323 that, when executed by the controller 320, enables the controller 320 to implement the operational device error correction functionality associated with the application 323. In the illustrated example, when the controller 320 executes the application 323, the controller 320 is enabled to: determine that a function is being implemented; determine context data of the second device 112 when the function is implemented; receive, from the one or more sensors 132 and/or the touch slider 122, data indicative of a user action for implementing a function; and transmit, to the communication device 101, using the communication interface 224 (e.g. via the link 134-2), operational data, that includes the data indicative of the user action for implementing the function, and the context data associated with the operational data. The operational data and the context data can be transmitted with an identifier of the second device 112 as well as an indication of the function implemented.

Furthermore, as depicted, the second device 112 optionally includes at least one light 360, for example at least light emitting diode (LED), which may be located adjacent to (e.g. LEDs surrounding the touch slider 122), and/or integrated with, with the touch slider 122, the at least one light 360 configured to indicate a location of the touch slider 122 as described in more detail below.

Figure 4:
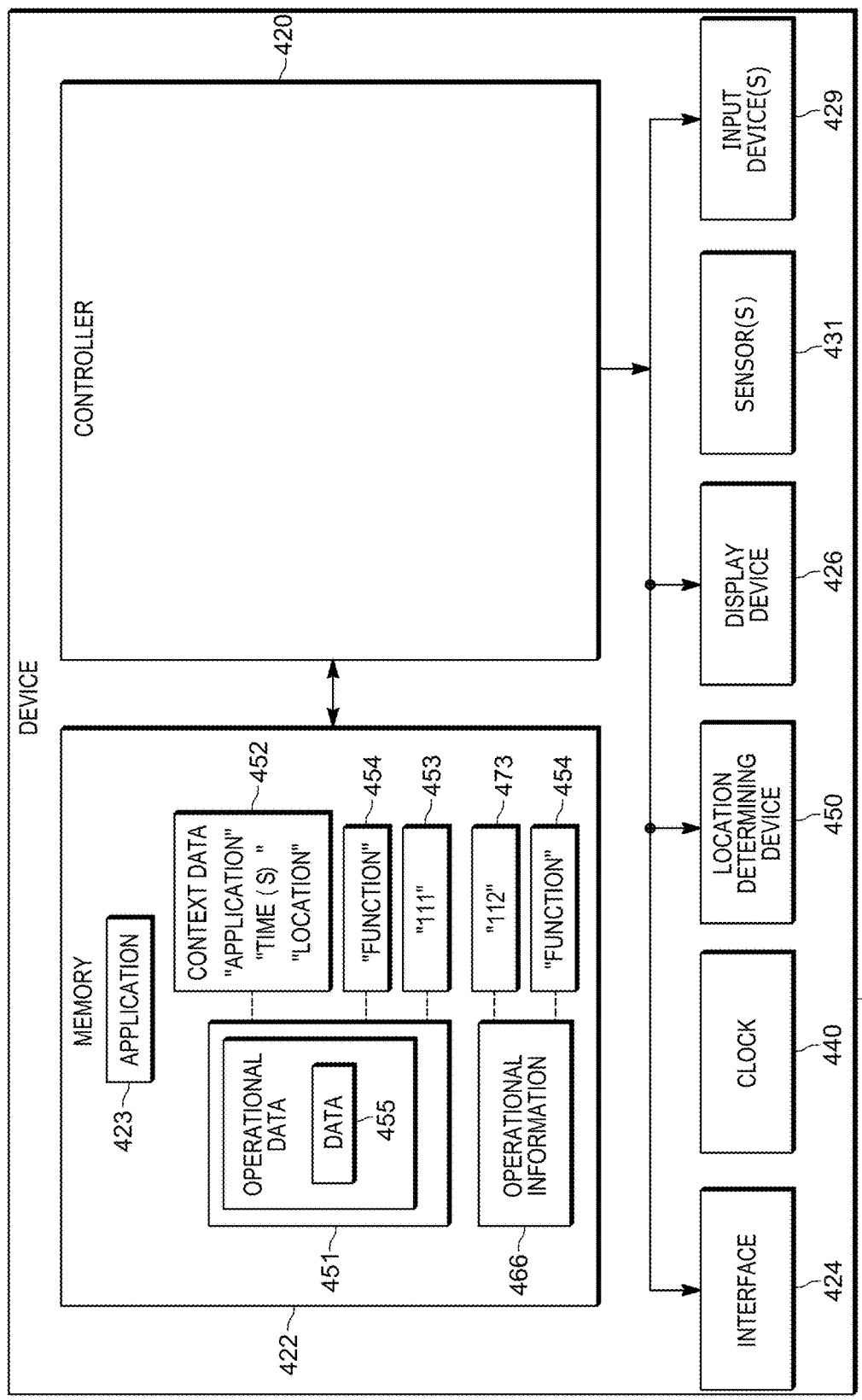
FIG. 4 depicts a block diagram of a communication device of the system of FIG. 1, the communication device configured for correcting operational device errors in accordance with some embodiments.

Attention is next directed to FIG. 4, which depicts a block diagram of the communication device 101, the device 101 comprising: a controller 420; a memory 422 storing an application 423; a communication interface 424 (interchangeably referred to as the interface 424); a display device 426; at least one input device 429; one or more optional sensors 431, a clock 440, and a location determining device 450.

The controller 420 is generally in communication with the memory 422, and the interface 424, the display device 426, the input device 429, the one or more sensors 431, the clock 440 and the location determining device 450.

In general, the controller 420, memory 422, and the interface 424, the display device 426, the input device 429, the one or more sensors 431, the clock 440 and the location determining device 450, are respectively similar to the controller 220, the memory 222, the interface 224, the display device 226, the input device 229, the one or more sensors 131, and the location determining device 250 of the first device 111, but adapted for the physical footprint and/or functionality of the device 101. For example, the interface 424 may not be configured to communicate using public safety communications and/or public safety standards and/or may. Furthermore, while not depicted, the device 101 may include additional or alternative components related to, for example, telephony, messaging, entertainment, and/or any other components that may be used with computing devices and/or communication devices; such components may include one or more speakers, one or microphones, and the like.

The one or more sensors 431 may comprise any sensors which can be used to sense data and/or sensor data indicative of a user action at the first device 111 and/or the second device 112 including, but not limited to, a camera device which may acquire images of a user action at the first device 111 and/or the second device 112. Sensor data from the one or more sensors 431 may be used in combination with data from the first device 111 and/or the second device 112 to sense user actions at the first device 111 and/or the second device 112. Sensor data from the one or more sensors 431 may be stored and/or acquired with when a function is implemented at the first device 111 and/or the second device 112 as indicated, for example, by receipt of operational data therefrom and/or data indicative of a function being implemented at the first device 111 and/or the second device 112.

As depicted, it is assumed that the memory 422 of the device 101 stores, and/or has been provisioned, with first operational data 451 associated with first context data 452 (interchangeably referred to hereafter as the context data 452) and the first device 111, for example as identified via a device identifier 453 (e.g. "111" identifying the first device 111). The association between the first operational data 451 and other data is indicated in FIG. 4 using broken lines therebetween; this convention will be used throughout the present specification. The first operational data 451 is generally indicative of how a given user action is performed at the first device 111 to implement a given function in a given context defined by the first context data 452.

As depicted, the first operational data 451 is further associated with an identifier 454 of given function implemented by the user action of which the first operational data 451 is indicative; as depicted, the identifier 454 is generically labelled as "Function", however the identifier 454 can comprise, for example "Audio" indicating that the given function implemented is an audio function (e.g. for adjusting the volume of the one or more speakers 230).

The first operational data 451 may be at least partially received at the device 101 from the first device 111 (e.g. by way of the first device executing the application 223) and/or may be included with the application 423.

As depicted, the first operational data 451 comprises data 455, for example as received from the first device 111 (and/or the one or more sensors 431) indicative of how a given user action is performed at the first device 111 to implement the given function (e.g. as identified by the identifier 454) in a given context defined by the first context data 452. The data 455 may include sensor data, input data (e.g. associated an input device), and/or any other data indicative of how a given user action is performed at the first device 111 to implement the given function in the given context defined by the first context data 452.

The context data 452 generally comprises one or more of: an identifier of an application (e.g. "Application") and/or an open application being implemented at the first device 111 when the given function was implemented; a time (and/or times) (e.g. "Time(s)") that the given function was implemented; and a location (and/or locations) (e.g. "Location") where the given function was implemented. In other words, the context data 452 generally defines one or more contexts in which the given function was implemented. For example, when the context data 452 includes an application identifier, but not a date and/or a time and/or a location, the context data 452 indicates that the given function is generally implemented in the context of the application identified by the context data 452 (e.g. when the application identified by the context data 452 is open). In another example, when the context data 452 includes a time, but not an application identifier and/or location, the context data 452 indicates that the given function is generally implemented in the context of the time, for example a given time period after the first device 111 has been turned on. In another example, when the context data 452 includes a location, but not an application identifier and/or date and/or a time, the context data 452 indicates that the given function is generally implemented in the context of the location.

Furthermore, the operational data 451 generally comprises data 455 indicative of how a given user action is performed at the first device 111 to implement the given function (e.g. in the given context defined by the first context data 452). In some embodiments, the data 455 includes sensor data and/or input device data and/or any data indicative of how a given user action is performed at the first device 111 to implement the given function.

While in FIG. 1 the device 101 stores only one set of operational data 451 and associated data for the first device 111, the device 101 may store operational data for a plurality of devices and/or a plurality of functions. Indeed, operational data stored at the device 101 may comprise a respective mapping of respective functions to one or more of: respective devices; respective context data; and respective user actions, defining how various functions are implemented at various devices in various contexts.

As depicted, the memory 422 further stores operational information 466 indicative of how to implement the given function, identified by the identifier 454, at the second device 112, for example in association with the identifier 454 and an identifier 473 of the second device 112 (e.g. "112"). The operational information 466 may be retrieved from an electronic user manual of the second device 112 (e.g. from the Internet) and/or provisioned at the memory 422 by an administrator of the device 101, and/or provisioned at the application 423.

For example, in some embodiments, when the second device 112 replaces the first device 111, a comparison of electronic user manuals of the devices 111, 112 may occur, for example at the device 101 and/or at a server device (not depicted) managing the device 101, to determine differences in implementing a same function at each of the devices 111, 112. Where differences are identified (e.g. adjusting volume at the location and position of the touch slider 122 as compared to adjusting volume at the location and position of the mechanical slider 121), the operational information 466 is retrieved from the electronic user manual of the second device 112 and associated with the identifier 454 of the function as implemented at the first device 111.

Indeed, when operational data (and associated context data) has been collected for functions that are implemented in a same manner at each of the devices 111, 112, such operational data may be deleted from the memory 422.

Put another way, only operational data for a given function (i.e. indicative of how a given user action is performed at the first device 111 to implement the given function) and associated operational information indicative of how to implement the given function at the second device 112 is stored at the memory 422.

The controller 420 includes one or more logic circuits, one or more processors, one or more microprocessors, one or more ASIC (application-specific integrated circuits) and one or more FPGA (field-programmable gate arrays). In some embodiments, the controller 420 and/or the device 101 is not a generic controller and/or a generic device, but a device specifically configured to implement operational device error correction functionality. For example, in some embodiments, the device 101 and/or the controller 420 specifically comprises a computer executable engine configured to implement specific functionality for operational device error correction.

The memory 422 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). Programming instructions (e.g., machine readable instructions) that implement the functional teachings of the device 101 as described herein are maintained, persistently, at the memory 422 and used by the controller 420 which makes appropriate utilization of volatile storage during the execution of such programming instructions.

In particular, the memory 422 of FIG. 4 stores instructions corresponding to the application 423 that, when executed by the controller 420, enables the controller 420 to implement the operational device error correction functionality associated with the application 423. In the illustrated example, when the controller 420 executes the application 423, the controller 420 is enabled to: receive data indicative of a user action at the second device 112; when the data indicative of the user action does not correspond to a respective function at the second device 112, and when current context data of the second device 112 corresponds to the first context data 452 of the first device 111, identify an intended function for the user action by comparing the data indicative of the user action with the first operational data 451 associated with the first context data 452; when the data indicative of the user action corresponds to the given function associated with the first operational data 451 of the first device 111, retrieve operational information 466 indicative of how to implement the given function at the second device 112; and control one or more notification devices to provide the operational information 466 of how to implement the given function at the second device 112.

Furthermore, while not depicted, it is assumed that device 101 includes a power source, including, but not limited to, a battery, a power pack, and the like.

It should be understood that a wide variety of configurations for the device 101 are within the scope of present embodiments.

Figure 5:
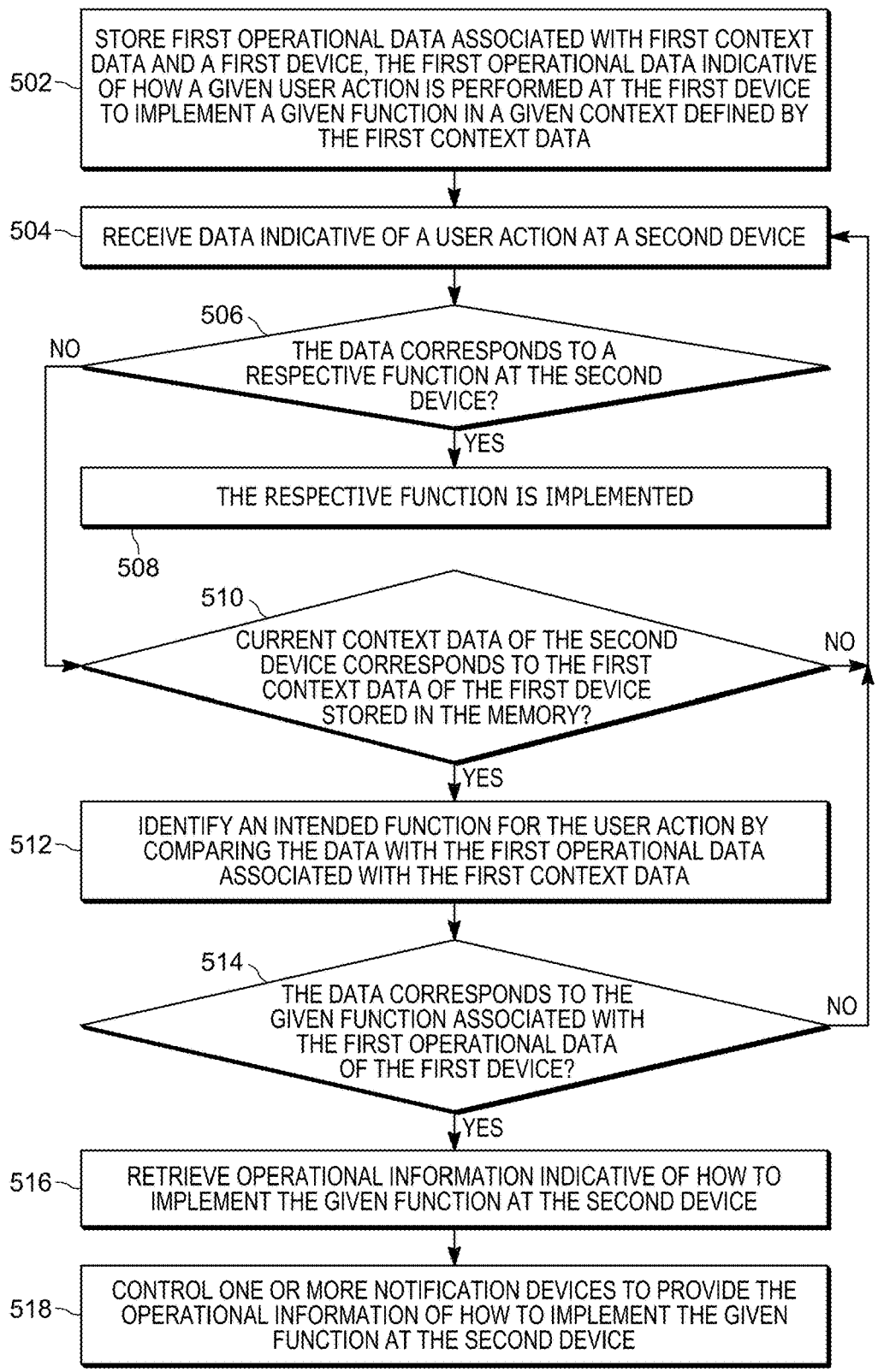
FIG. 5 is a flowchart of a method for correcting operational device errors in accordance with some embodiments.

Attention is now directed to FIG. 5 which depicts a flowchart representative of a method 500 for operational device error correction. In some embodiments, the operations of the method 500 of FIG. 5 correspond to machine readable instructions that are executed by, for example, the device 101 of FIG. 4, and specifically by the controller 420 of the device 101. In the illustrated example, the instructions represented by the blocks of FIG. 5 are stored at the memory 422, for example, as the application 423. The method 500 of FIG. 1 is one way in which the device 101 and/or the controller 420 and/or the system 100 is configured. Furthermore, the following discussion of the method 500 of FIG. 5 will lead to a further understanding of the system 100 and the device 101, and their various components.

However, it is to be understood that the device 101 and/or the controller 420 and/or the method 500 and/or the system 100 may be varied, and need not work exactly as discussed herein in conjunction with each other, and that such variations are within the scope of present embodiments.

Furthermore, the method 500 of FIG. 5 need not be performed in the exact sequence as shown and likewise various blocks may be performed in parallel rather than in sequence. Accordingly, the elements of method 500 are referred to herein as "blocks" rather than "steps".

At a block 502, the controller 420 stores the first operational data 451 associated with the first context data 452 and the first device 111, the first operational data 451 indicative of how a given user action is performed at the first device 111 to implement a given function in a given context defined by the first context data 452. In some embodiments, the block 502 is implemented at least in part when the device 101 is in communication with the first device 111, for example before the user 103 switches to the second device 112. In other embodiments, the block 502 is implemented by the controller 420 receiving the first operational data 451 via a communication link with, for example, a remote device, and/or via a message and the like. In other words, the first operational data 451 and associated data may be provisioned at the device 101 without the device 101 having collected the first operational data 451 from the first device 111.

At a block 504, the controller 420 receives data indicative of a user action at the second device 112, for example from the one or more sensors 132 of the second device 112 and/or the one or more sensors 431 of the device 101, and/or an input device being operated at the second device 112.

At the block 506, the controller 420 determines whether the data received at the block 504 corresponds to a respective function of the second device 112. When a correspondence occurs (e.g. a "YES" decision at the block 506), at a block 508, it is assumed that the respective function occurs at the second device 112. Indeed, a "YES" decision at the block 506 may merely indicate that the second device 112 has been operated as intended.

However, when no correspondence occurs at the block 506 (e.g. a "NO" decision at the block 506), at a block 510 the controller 420 determines whether current context data of the second device 112 corresponds to the first context data 452 of the first device 111 (e.g. as stored in the memory 422). When no correspondence occurs at the block 510 (e.g. a "NO" decision at the block 510), no function is implemented and the controller 420 continues to receive, at the block 504, data indicative of a user action at the second device 112.

When a correspondence occurs at the block 510 (e.g. a "YES" decision at the block 510), at a block 512, the controller 420 attempts to identify an intended function for the user action by comparing the data received at the block 504 with the first operational data 451 associated with the first context data 452.

At a block 514, the controller 420 determines whether the data received at the block 504 corresponds to the given function associated with the first operational data 451 of the first device 111.

When no correspondence occurs at the block 514 (e.g. a "NO" decision at the block 514), no function is implemented and the controller 420 continues to receive, at the block 504, sensor data indicative of a user action at the second device 112.

When a correspondence occurs at the block 514 (e.g. a "YES" decision at the block 510), at a block 516, the controller 420 retrieves operational information 466 indicative of how to implement the given function at the second device 112.

At a block 518, the controller 420 controls one or more notification devices to provide the operational information 466 of how to implement the given function at the second device 112. For example, the controller 420 may control one or more of the display device 326, the one or more speakers 330, the at least one light 360, the display device 426, and a speaker at the device 101 to provide the operational information 466 visually and/or audibly and/or using a light to indicate a position of input device for implementing the operational information 466. In other words, in the present specification, each of the display device 326, the one or more speakers 330, the at least one light 360, the display device 426, and a speaker at the device 101 comprises a notification device.

Various embodiments of the method 500 will now be described hereafter with reference to FIG. 6 to FIG. 11.

Figure 6:
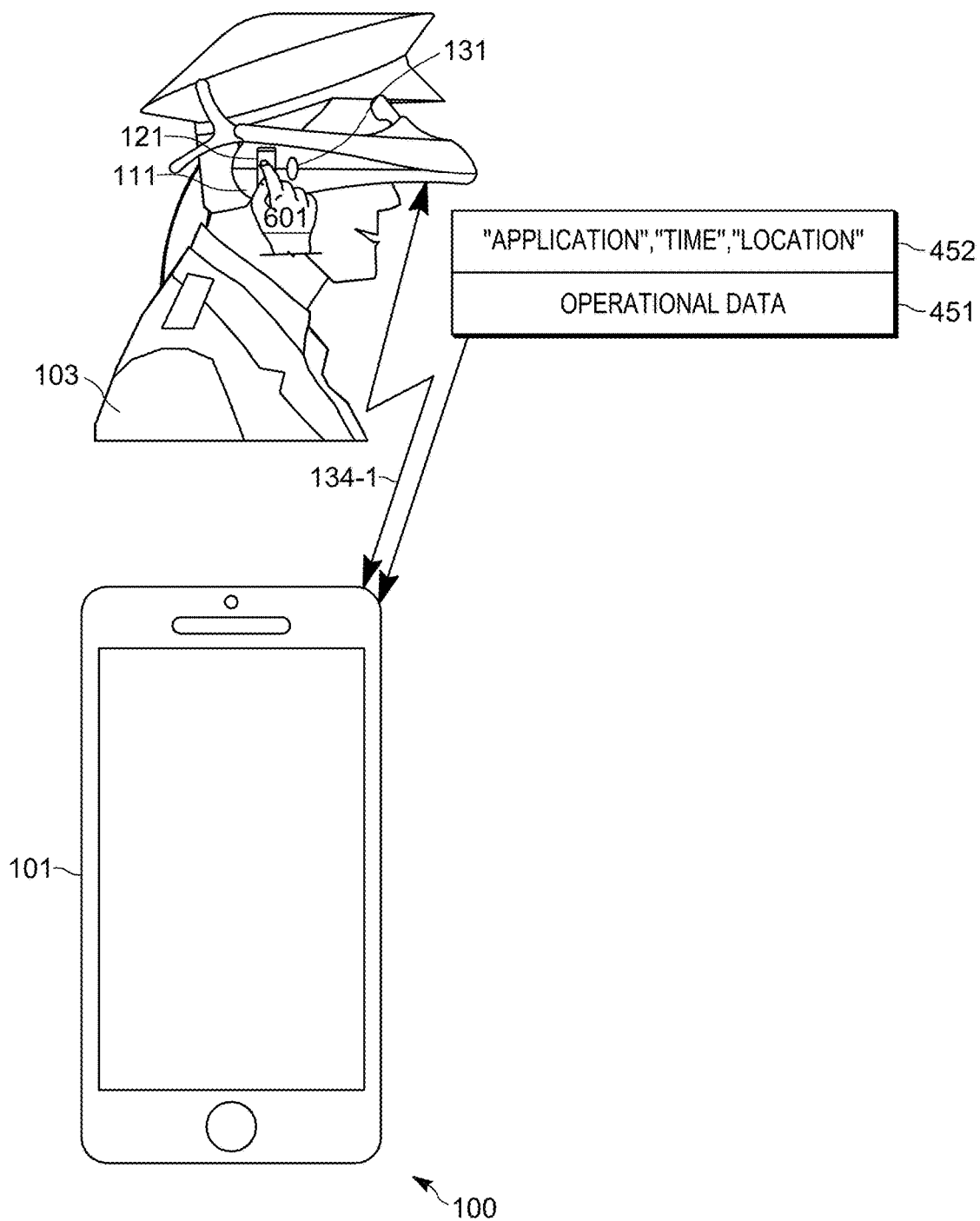
FIG. 6 depicts the communication device collecting operational data and context data from the first device in accordance with some embodiments.

Attention is next directed to FIG. 6 which depicts the device 101 and the first device 111 forming a PAN via the link 134-1. The user 103 is operating the mechanical slider using a finger of a hand 601 to adjust volume of the one or more speakers 230. In response, the first device 111 transmits, to the device 101, the operational data 451 that may include sensor data indicative of the position of the finger of and/or the hand 601 as the mechanical slider 121 was operated to adjust the volume. The first device 111 further transmits context data 452 indicative of one or more of an application being implemented at the first device 111 when the volume was adjusted (e.g. an open application), a time that the volume was adjusted and/or a location at which the volume was adjusted. The first device 111 may further transmit an identifier (e.g. the identifier 454) indicating that the transmitted operational data 451 and context data 452 is associated with a function where volume is adjusted. The first device 111 may further transmit an identifier of the first device 111, though the device 101 may identify any data received on the link 134-1 as having been received from the first device 111.

Hence, FIG. 6 depicts an example embodiment of the block 502 of the method 500 in which the controller 420 of the device 101 stores the first operational data 451 associated with the first context data 452 and the first device 111. The device 101 may further add to the operational data 451 and the context data 452 received from the first device 111, and or generate operational data and context data, based on data from the one or more sensors 431, the clock 440, the location determining device 450, the one or more input devices 429, etc.

Figure 7:
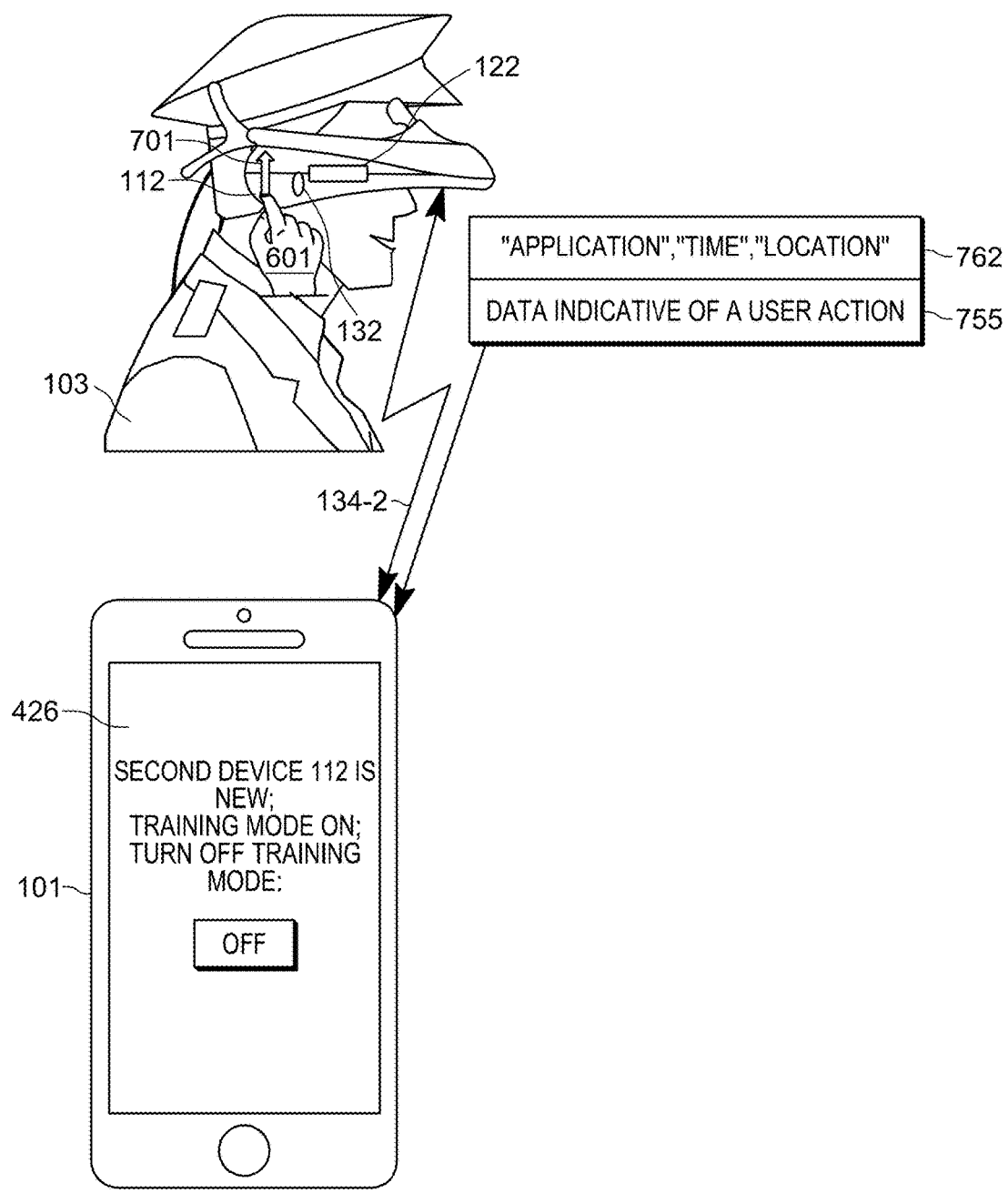
FIG. 7 depicts the communication device receiving data indicative of a user action at the second device, along with a current context of the second device in accordance with some embodiments.

Attention is next directed to FIG. 7 which depicts the device 101 and the second device 112 forming a PAN via the link 134-2. In other words, in FIG. 7, the user 103 has switched from using the first device 111 to using the second device 112. It is assumed in FIG. 7 that such a switch further includes provisioning, at the memory 422, the operational information 466 as described above.

As also depicted in FIG. 7, the controller 720 has been configured to operate in a training mode. For example, the training mode may be automatically turned on at the device 101 whenever a new device replaces a previous device (e.g. of a same device type) in the PAN, for example, the second device 112 replacing the first device 111. As depicted, the device 101 is providing an indication of the training mode being "ON" at the display device 426, as well as a virtual "OFF" button for turning off the training mode. However, such a virtual "OFF" button, and the like, may be selected using a menu system, and the like, at the device 101. In example embodiments, the method 500 may be implemented only in the training mode such that control of one or more notification devices to provide the operational information of how to implement a given function at the second device, as described below, occurs only in the training mode. The training mode may be turned off one or more of: after a given time period (e.g. which may be configurable at the device 101); upon receipt of input from an input device (e.g. the virtual "OFF" button being selected at a touch screen of the display device 426); and after all operational data associated with the first device 111 and/or other devices, is deleted from the memory 422, as described below.

In FIG. 7, the user 103 is attempting to adjust the volume of the one or more speakers 330 of the second device 112 by incorrectly implementing a user action associated with adjusting volume using the mechanical slider 121 at the first device 111. In particular, a finger of the hand 601 of the user 103 is located at the same relative position of the mechanical slider 121 and not at the touch slider 122. Furthermore, the finger of the hand 601 is moving upwards (as indicated by the arrow 701) to attempt to increase volume, rather than side-to-side.

The controller 320 of the second device 112 determines from sensor data, received from the one or more sensors 132, that a user action has occurred adjacent the second device 112, but that no input device (e.g. the touch slider 122) has been actuated. The controller 320 responsively transmits, to the device 101, data 755 indicative of the user action at the second device 112, such as the sensor data, as well as current context data 762 which may include an identifier of an application (e.g. the audio application 353) being executed (e.g. an open application) at the second device 112 when the user action occurred, a time of the user action and a location of the user action. Hence, FIG. 7 depicts an example embodiment of the block 504 of the method 500. Indeed, in some embodiments, the second device 112 may transmit the data 755 indicative of the user action at the second device 112 and the current context data 762 only when the controller 320 determines that a user action has occurred at the second device 112 that has not resulted in a function being implemented.

Figure 8:
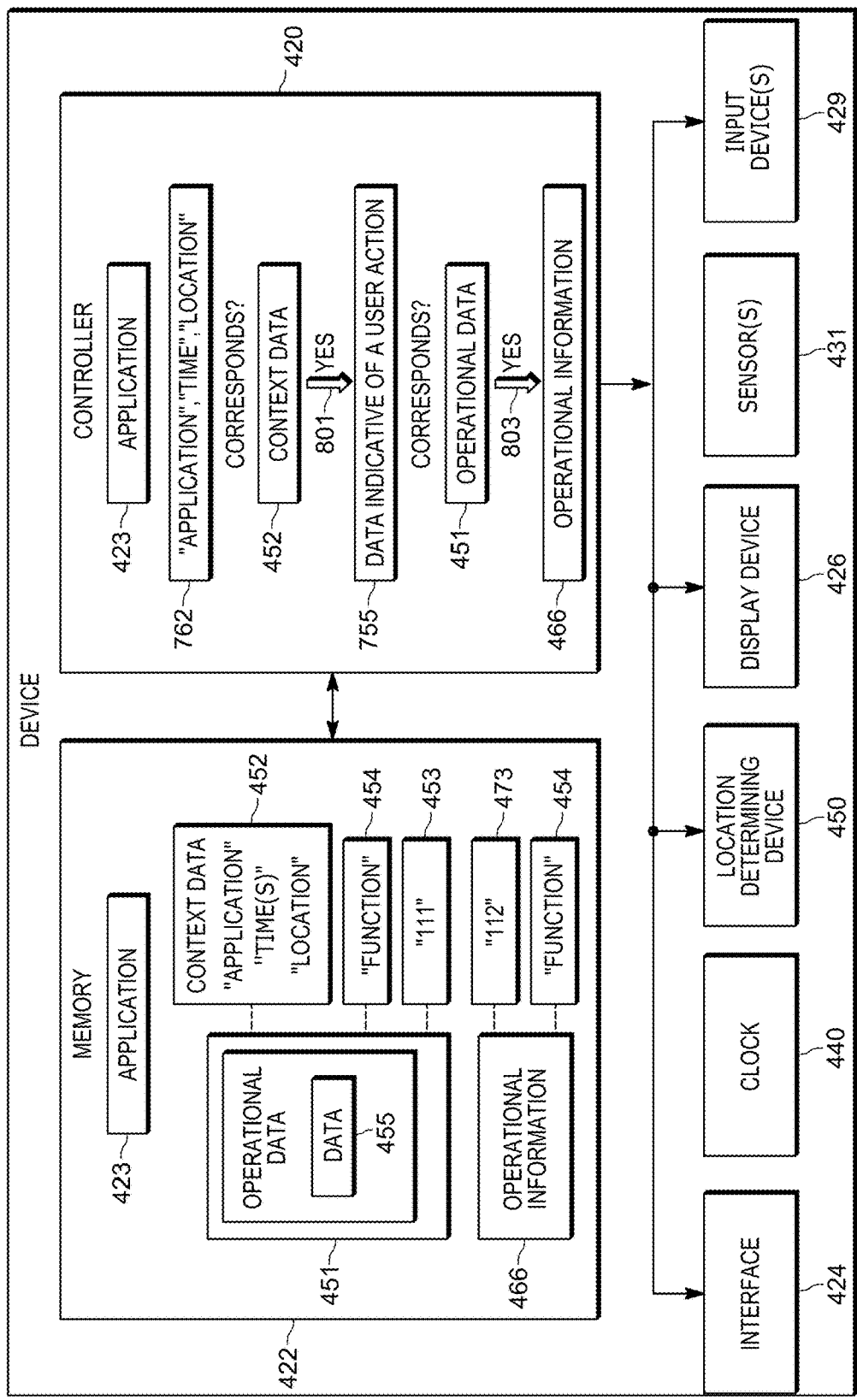
FIG. 8 depicts the communication device receiving data implementing a portion of the method of FIG. 5 to retrieve operational information indicative of how to implement a given function at the second device in accordance with some embodiments.

Attention is next directed to FIG. 8 which is substantially similar to FIG. 4, with like components having like numbers. However, in FIG. 8, the controller 420 is executing the application 423 and the device 101 has received, from the second device 112, the data 755 indicative of the user action at the second device 112 and the current context data 762. The device 101 may further add to the data 755 indicative of the user action at the second device 112 and the current context data 762 received from the second device 112, and or generate operational indicative of the user action at the second device 112 and current context data, based on data from the one or more sensors 431, the clock 440, the location determining device 450, the one or more input devices 429, etc.

By virtue of receipt of the data 755 indicative of the user action at the second device 112 and the current context data 762, the device 101 may determine that the data 755 does not correspond to a respective function at the second device 112 (e.g. a "NO" decision occurs at the block 506) and the controller 220 otherwise assumes (e.g. a "YES" decision occurs at the block 506) that any detected user action at the second device 112 (e.g. using the one or more sensors 431) has resulted in a respective function being implemented, e.g. at the block 508.

In other words, the controller 420 may be further configured to determine that the data 755 indicative of the user action does not correspond to a respective function at the second device 112 when no function is implemented at the second device 112 is response to the user action, for example as indicated by receipt of the data 755.

As further depicted in FIG. 8, as the data 755 indicative of the user action at the second device 112 did not correspond to any function at the second device 112, the controller 420 determines (e.g. at the block 510) whether the current context data 762 corresponds to the context data 452 associated with the operational data 451. It is assumed in FIG. 8 that a "YES" decision occurs at the block 510, as indicated by the arrow 801; for example, a time in the current context data 762 may correspond to a time in the context data 452. In particular, at the first device 111, the user 103 may have generally adjusted volume within a given time period after turning on the first device 111, and/or at a given location (e.g. at a police station at the beginning of a shift) and the time and location in the current context data 762 may be correspond about the same given time period and location indicated by the context data 452.

As also depicted in FIG. 8, the controller 420 identifies (e.g. at the block 512 of the method 500) an intended function for the user action indicated by the data 755 by comparing the data 755 with the first operational data 451 associated with the first context data 452 to determine (e.g. at the block 514 of the method 500) whether the data 755 corresponds to the given function associated with the first operational data 451, for example as identified by the identifier 454. When a correspondence occurs (e.g. a "YES" decision at the block 514, as indicated by the arrow 803) the given function is identified as the intended function for the user action indicated by the data 755 and the associated operational information 466 is retrieved (e.g. at the block 516 of the method 500).

Figure 9:
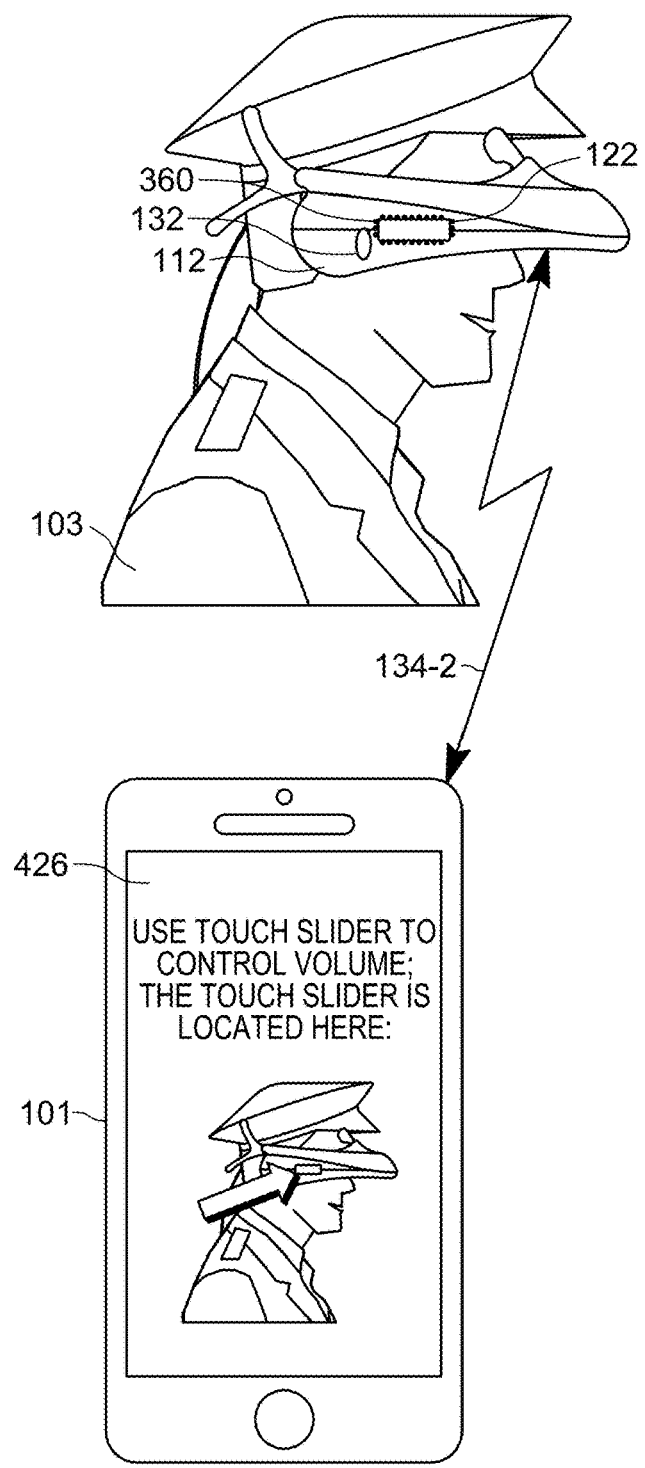
FIG. 9 depicts the communication device receiving data controlling a notification device to provide the operational information in accordance with some embodiments.

Attention is next directed to FIG. 9, which depict an example of the block 518, in which one or more notification devices are controlled to provide the operational information 466 of how to implement the given function at the second device 112. In particular, the operational information 466 includes data indicating a location of the touch slider 122 at the second device 112 which, as depicted, includes an image of the location of the touch slider 122 at the second device 112, for example as retrieved from an electronic user manual of the second device 112.

As depicted, the display device 426 of the device 101 is controlled to provide the operational information 466, however the display device 326 of the second device 112 may also be controlled to provide the operational information 466; indeed, as the second device 112 is an augmented reality device, it may be preferred in the example embodiment to control the display device 326 of the second device 112 to provide the operational information 466. Alternatively, the operational information 466 may be audibly output at a speaker of one or more of the device 101 and the second device 112. As the operational information 466, as depicted, includes an image of the second device 112, when the operational information 466 is audibly output at a speaker, the image may be replaced with audible instructions to look at the image at the display device 326 and/or the display device 426.

Alternatively, the operational information 466 may be visually indicated using the at least one light 360 (as depicted in FIG. 9), for example by controlling the at least one light 360 (which surround the touch slider 122 in FIG. 9) to light up; in other words, in block 518, a light may be used to indicate a position of an input device used to implement the function associated with the operational information 466.

Hence, when the user 103 incorrectly attempts to operate the second device 112 to implement a function using a user action for implementing the same function at the first device 111, the operational information 466 of how to implement the given function at the second device 112 is provided to correct the user 103 by providing the operational information 466 at one or more notification devices located at one or more of the device 101 and the second device 112, which may include using the at least one light 360 to indicate a position of input device to be used to implement the operational information 466.

Furthermore, the controller 420 may be further configured to delete, from the memory 422, the first operational data 451, one or more of: after the operational information 466 is provided; after the operational information 466 is provided a given number of times (e.g. as the user 103 may need the given number of times to be trained to use the touch slider 122); after a given time period following providing of the operational information 466; and when a respective function is correctly implemented at the second device 112, the respective function corresponding to the given function defined by the first operational data 451. In some embodiments, once the first operational data 451 (and/or any other operational data used in execution of the method 500) is deleted, the training mode may be turned off by the controller 420. In other words, such deletion of the first operational data 451 generally indicates that the user 103 has been trained to use the touch slider 122 at the second device 112.

In the example embodiments described with respect to FIG. 1 to FIG. 9, peripheral devices in a PAN with the communication device 101 are switched, and the communication device 101 implements the method 500 to provide operational information of how to implement a given function at a second device when a user action that attempts to operate the second device to implement the given function is performed according to how the given function is implemented at the first device.

However, the method 500 may also be implemented at a second device, for example when the second device replaces a first device. For example, a user may initially be using a first mobile device that operates according to a first operating system; the user may exchange the first mobile device for a second mobile device that operates according to a second operating system. Such a scenario may occur, for example when a user changes from an Apple™ device to an Android™ device.

Figure 10:
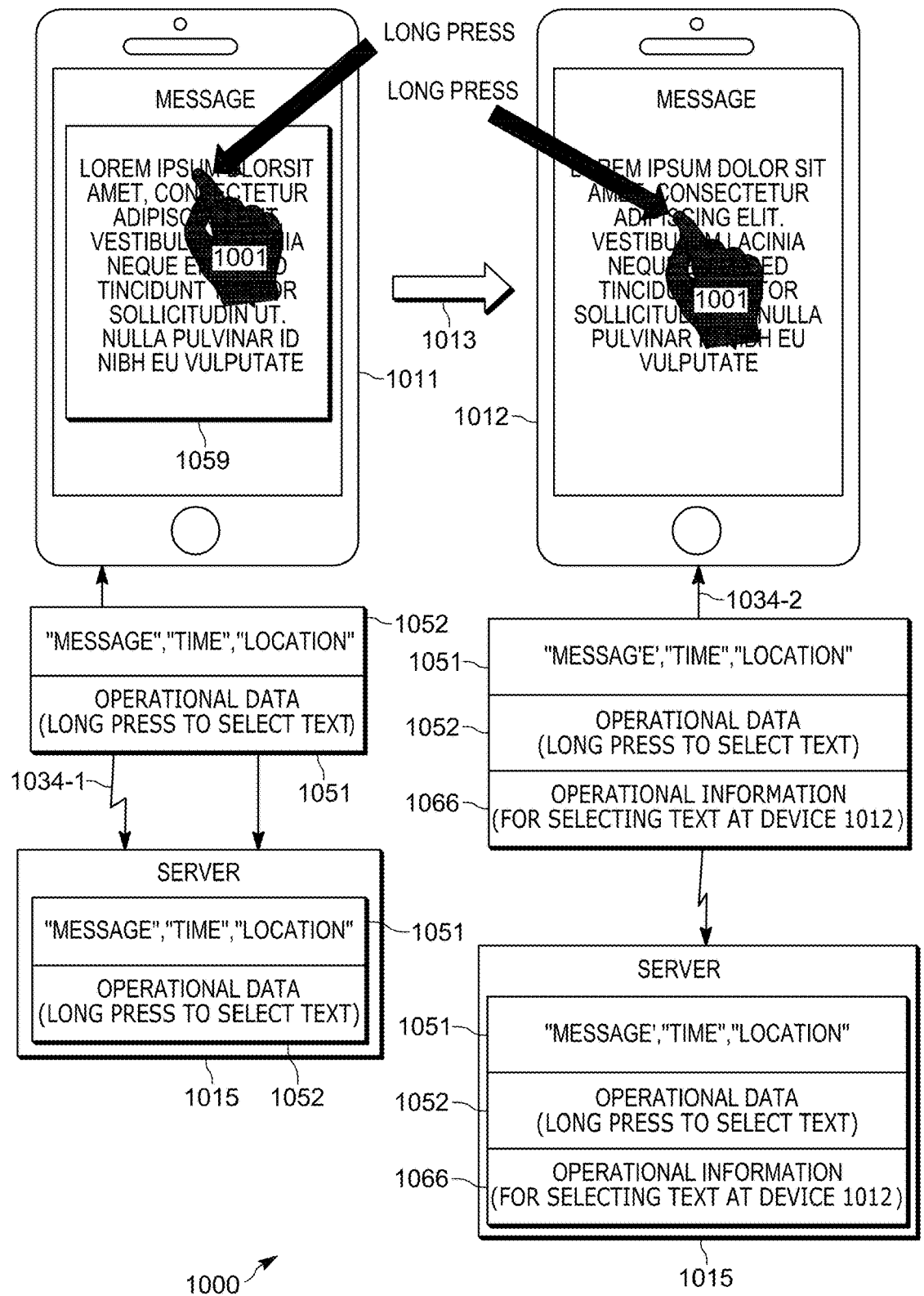
FIG. 10 depicts a system in which a second device is replaced by a first device, the second device needing a different user action for selecting text in a messaging application as compared to the first device in accordance with some embodiments.

Hence, attention is next directed to FIG. 10 which depicts a system 1000 in which a user, as represented by a hand 1001, is initially using a first device 1011 and switches to using a second device 1012, the switch represented by the arrow 1013. The switch from the first device 1011 to the second device 1012 is generally managed by a server 1015. While not depicted, it is assumed that the server 1015 comprises a controller, a memory and a communication interface, similar to controllers, memories and communication interfaces described herein, but adapted for the functionality of the server 1015. The server 1015 may, for example, be a server of a service provider for the devices 1011, 1012 and/or a server of an entity deploying the devices 1011, 1012 (e.g. to members of a business and/or a first responder agency, and the like).

Hence, as depicted, the server 1015 is initially in communication with the first device 1011 via a communication link 1034-1 and, when the user switches to the second device 1012, the server 1015 is in communication with the second device 1012 via a communication link 1034-2.

Each of the devices 1011, 1012 may have a similar structure to the device 101, as depicted in FIG. 4, though (like the first device 111), the device 1011 (e.g. a controller thereof) is generally configured to: determine that a function is being implemented; determine context data of the first device 1011 when the function is implemented; receive data indicative of a user action for implementing the function; and transmit, to the server 1015, using a communication interface (not depicted, but assumed may be similar to the interface 424), and the link 1034-1, operational data 1051, that includes the data indicative of the user action for implementing the function, and context data 1052 associated with the operational data. The operational data 1051 and the context data 1052 can be transmitted with an identifier of the first device 1011 as well as an indication of the function implemented.

For example, as depicted, the first device 1011 is implementing a messaging application, and the user is selecting a paragraph of text in the messaging application using a long press at an area of a touch screen of a display device of the first device 1011. The selection of the paragraph of text using the long press is represented by the box 1059. As will be described in further detail below, in the depicted example, a long press within a messaging application at the second device 1012 has no associated function, and furthermore a paragraph of text is in a messaging application is selected using double tap at a touch screen of the second device 1012.

In response to receipt of the long press, and the implementation of the select text function, the first device 1011 generates the operational data 1051 which includes data indicative of how a given user action (e.g. a long press) is performed at the first device 1011 to implement a given function (e.g. selecting text), for example in the messaging application, which is further identified (e.g. "Message") in the context data 1052. The context data 1052 may further comprise a time and/or location in which the function for selecting text was implemented.

The server 1015 generally stores the operational data 1051 and the associated context data 1052 (e.g. in association with an identifier of the first device 1011 and an identifier of the function (not depicted), for example in a database.

When the user switches to using the second device 1012, the server 1015 may compare electronic user manuals of the devices 1011, 1012 to determine operational information 1066 indicative of how to implement the given function associated with the stored operational data 1051 (e.g. selecting text in a messaging application) at the second device 1012. The server 1015 may further be provisioned with such operational information 1066, as, for example, such switches of devices may be a common activity among users whose devices are managed by the server 1015. The server 1015 may be informed of the switch when the second device 1012 first registers with the server 1015 (e.g. using the same telephone number and/or subscriber identity card number as the first device 1011) and/or the switch may be registered at the server 1015 by an administrator, and the like, of the system 1000.

Alternatively, the operational data 1051, the associated context data 1052 may be also determined from a comparison of the electronic user manuals of the devices 1011, 1012, for example to determine differences in operation therebetween and contexts thereof. In such embodiments, the context data 1052 would identify an application in which a function associated with the operational data 1051 occurs (e.g. text selection in a messaging application), without a time and/or location.

In any event, when the second device 1012 first registers with the server 1015 and/or when a training mode is turned on at the second device 1012 and/or upon request by the second device 1012, the server 1015 transmits the operational data 1051, the associated context data 1052, and the operational information 1066 to the second device 1012 for storage thereupon (e.g. in memory thereof, similar to the memory 422). Such a transmission represents an example embodiment of the block 502 of the method 500, assuming that the method 500 is being implemented at a controller of the second device 1012 (similar to the controller 420).

As further depicted in FIG. 10, the second device 1012 is executing a messaging application similar to the messaging application at the first device 1011, and the user is attempting to select a paragraph of text in the messaging application using a long press applied to a touch screen by a finger of the hand 1001. However, as a long press within the messaging application of the second device 1012 does not result in selection of text (or, in the example depicted, any function being implemented), nothing occurs in response to the long press.

However, it is assumed that a controller of the second device 1012 is implementing the method 500 and receives (e.g. at the block 504), from the touch screen data indicative of a user action at the second device 1012, and specifically data indicative of a long press at the touch screen. As the long press results in no function being implemented within the messaging application (e.g. a "NO" decision at the block 506), the controller of the second device 1012 determines (e.g. at the block 510 of the method 500) whether current context data of the second device 1012 corresponds to the context data 1052. As depicted, such a correspondence occurs (e.g. a "YES" decision at the block 510) as both the current context data of the second device 1012 and the context data 1052 identify a messaging application. As such, the controller of the second device 1012 identifies (e.g. at the blocks 512, 514 of the method 500) that the long press received at the touch screen corresponds to a text selection function at the first device 1011 and the controller of the second device 1012 retrieves (e.g. at the block 516 of the method 500), the operational information 1066.

In some embodiments, the operational information 1066 may not be transmitted to the second device 1012 from the server 1015 until the block 516 of the method 500 is implemented. In other words, in some embodiments, the block 516 of the method 500 includes retrieving operational information 1066 from the server 1015, for example from a database at the server 1015.

Figure 11:
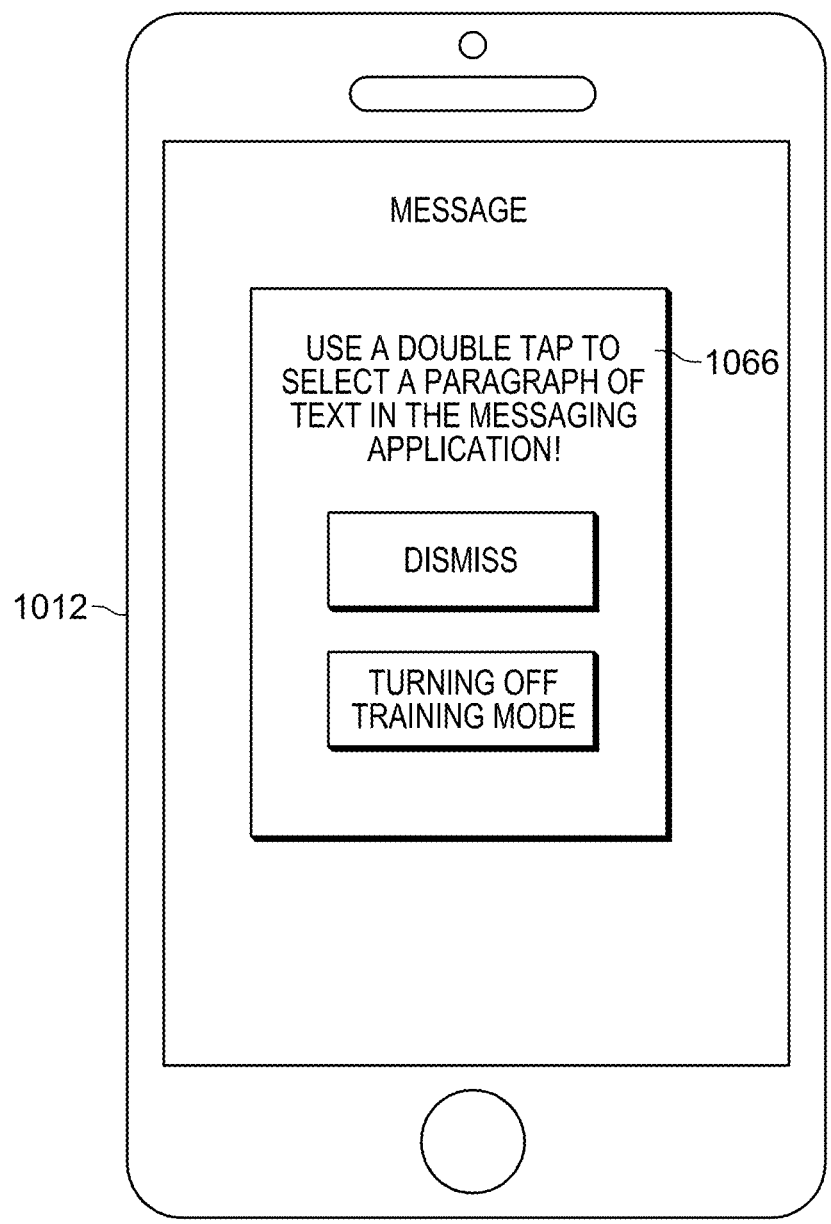
FIG. 11 depicts the second device of FIG. 10 provide operational information for selecting text in a messaging application when a user attempts to select text using a user action for selecting text at the first device in accordance with some embodiments.

Attention is next directed to FIG. 11 which depicts the second device 1012 implementing the block 518 of the method 500. In particular, in response to receipt of the long press in the context of the messaging application, a controller of the second device 1012 controls a display device of the second device 1012 to provide the operational information 1066 (e.g. as depicted the text "Use A Double Tap To Select A Paragraph Of Text In The Messaging Application"). The operational information 1066 may be dismissed using a virtual button "DISMISS" and/or the training mode may be turned off at the second device 1012 via a virtual button "TURN OFF TRAINING MODE".

In this manner, a user of the second device 1012 may be trained to use the functionality of the second device 1012 and/or to correct operational device errors at the second device 1012.

While correction of two types of operational devices errors are described herein with regards to the method 500, correction of other types of operational device errors are within the scope of the present specification.

For example, a communication device in a PAN (similar to the device 101) may determine that a new remote speaker-microphone (e.g. having a 2-microphone port for noise cancellation) has replaced an older remote speaker-microphone (e.g. having a 1-microphone port without noise cancellation). The communication device may determine (e.g. using data retrieved from a database (e.g. at a server)) that the new remote speaker-microphone is to be worn in a horizontal orientation (e.g. such that noise cancelling functionality of the new remote speaker-microphone may occur properly), as compared to the older remote speaker-microphone that may be worn in vertical orientation. Upon detecting a user attempting to mount the new remote speaker-microphone on their body (e.g. using sensors at the new remote speaker-microphone and/or the communication device), for example in a context of the mounting occurring at the beginning of a shift, the communication device may provide audible instructions (e.g. via a speaker) to mount the new remote speaker-microphone.

In another example, a communication device may determine that a new radio in a PAN has replaced an old radio. The communication device may determine (e.g. using data retrieved from a database (e.g. at a server)) that the new radio has a different menu navigation path to operate one or more functions, as compared to a menu navigation path at the old radio for operating the same one or more functions. The communication device may also determine, from context data, a user generally accessed the menu system at the old radio according to a given time and/or given location. Hence, when a current context of the new radio includes the new radio being at the given location (e.g. which may be determined using a geofence and/or the current time is at about the give time, the communication device may automatically provide instructions for accessing the one or more given functions using the new menu navigation path.

In another example, a user may replace a first device with a second device. At the first device, a virtual assistant may be launched using a double tap at a physical button of the first device. At the second device, a virtual assistant may be launched using a long press in a given area of a touch screen associated with launching a virtual assistant. The second device may determine (e.g. using data retrieved from a database (e.g. at a server)) that a double tap in the given area of a touch screen associated with launching a virtual assistant indicates that the user is trying to launch the virtual assistant, and automatically provide instructions that a long press is used to launch the virtual assistant, for example in the context of the double tap received at the second device being received at a similar time as the virtual assistant being launched at the first device (e.g. at a given time of the morning).

In another example, a communication device may determine that a new radio in a PAN has replaced an old radio. The communication device may determine (e.g. using data retrieved from a database (e.g. at a server)) that the new radio has a limited rotation volume knob (with stopper) as compared to the old radio which has an infinity and/or continuous rotation volume knob. The communication device may detect that the volume knob at the new radio is being rotated and automatically provide instructions for operating the volume knob, for example, to prevent the user from attempting rotate through the stopper, which could damage the volume knob, for example in the context of an audio application being implemented and/or at a given time and/or a given location.

Provided herein are systems, devices and method for correcting operational device errors, by providing operational instructions for operating a second device, which replaces a first device, when the second device is incorrectly operated in a manner of the first device. Such providing of operational instructions may reduce user frustration, but may further reduce use of processing resources at the second device and/or present damage to the second device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" can be construed as X only, Y only, Z only, or any combination of at least two items X, Y, and Z (e.g., XYZ, XY, YZ, ZZ, and the like). Similar logic can be applied for at least two items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
a memory storing first operational data associated with first context data and a first device, the first operational data indicative of how a given user action is performed at the first device to implement a given function in a given context defined by the first context data; and
a controller configured to:
receive data indicative of a user action at a second device;
when the data indicative of the user action at the second device does not correspond to a respective function at the second device, and when current context data of the second device corresponds to the first context data of the first device, identify an intended function for the user action by comparing the data indicative of the user action at the second device with the first operational data associated with the first context data;
when the data indicative of the user action at the second device corresponds to the given function associated with the first operational data of the first device, retrieve operational information indicative of how to implement the given function at the second device; and
control one or more notification devices to provide the operational information of how to implement the given function at the second device.

2. The device of claim 1, wherein the data indicative of the user action at the second device comprises one or more of: input data from one or more input devices; and sensor data from one or more sensor devices.

3. The device of claim 1, wherein controller is further configured to determine that the data indicative of the user action at the second device does not correspond to the respective function at the second device when no function is implemented at the second device is response to the user action.

4. The device of claim 1, wherein each of the first operational data comprises a respective mapping of respective functions to one or more of: respective devices, respective context data, and respective user actions.

5. The device of claim 1, wherein the first context data includes one or more of: a time associated with the given user action, a location associated with the given user action, and an application associated with the given user action.

6. The device of claim 1, wherein the current context data includes one or more of: a current time associated with the user action, a current location associated with the user action, and an open application associated with the user action.

7. The device of claim 1, further comprising a communication interface configured to communicate with the second device in a personal area network, at least a portion of the data indicative of the user action at the second device being received from the second device via the communication interface.

8. The device of claim 1, wherein the controller is further configured to: operate in a training mode; and control the one or more notification devices to provide the operational information of how to implement the given function at the second device only in the training mode.

9. The device of claim 8, wherein the controller is further configured to disable the training mode one or more of: after a given time period; and upon receipt of input from an input device.

10. The device of claim 1, wherein the controller is further configured to delete, from the memory, the first operational data, one or more of: after the operational information is provided; after the operational information is provided a given number of times; after a given time period following providing of the operational information; and when a respective function is correctly implemented at the second device, the respective function corresponding to the given function defined by the first operational data.

11. The device of claim 1, wherein the one or more notification devices is located at one or more of the device and the second device.

12. A method comprising:
receiving, at a controller, data indicative of a user action at a second device, the controller in communication with a memory storing first operational data associated with first context data and a first device, the first operational data indicative of how a given user action is performed at the first device to implement a given function in a given context defined by the first context data;
when the data indicative of the user action at the second device does not correspond to a respective function at the second device, and when current context data of the second device corresponds to the first context data of the first device, identifying, at the controller, an intended function for the user action by comparing the data indicative of the user action at the second device with the first operational data associated with the first context data;
when the data indicative of the user action at the second device corresponds to the given function associated with the first operational data of the first device, retrieving, at the controller, from the memory, operational information indicative of how to implement the given function at the second device; and controlling, using the controller, one or more notification devices to provide the operational information of how to implement the given function at the second device.

13. The method of claim 12, wherein the data indicative of the user action at the second device comprises one or more of: input data from one or more input devices; and sensor data from one or more sensor devices.

14. The method of claim 12, further comprising: determining that the data indicative of the user action at the second device does not correspond to the respective function at the second device when no function is implemented at the second device is response to the user action.

15. The method of claim 12, wherein each of the first operational data comprises a respective mapping of respective functions to one or more of: respective devices, respective context data, and respective user actions.

16. The method of claim 12, wherein the first context data includes one or more of: a time associated with the given user action, a location associated with the given user action, and an application associated with the given user action.

17. The method of claim 12, wherein the current context data includes one or more of: a current time associated with the user action, a current location associated with the user action, and an open application associated with the user action.

18. The method of claim 12, wherein the controller is in communication with a communication interface configured to communicate with the second device in a personal area network, at least a portion of the data indicative of the user action at the second device being received from the second device via the communication interface.

19. The method of claim 12, further comprising: operating the controller in a training mode; controlling the one or more notification devices to provide the operational information of how to implement the given function at the second device only in the training mode; and disabling the training mode one or more of: after a given time period; and upon receipt of input from an input device.

20. The method of claim 12, further comprising: deleting, from the memory, the first operational data, one or more of: after the operational information is provided; after the operational information is provided a given number of times; after a given time period following providing of the operational information; and when a respective function is correctly implemented at the second device, the respective function corresponding to the given function defined by the first operational data.

* * * * *